June 21, 1960
D. CROCKWELL
2,941,458
CAMERA APPARATUS
Filed March 6, 1958
2 Sheets-Sheet 1
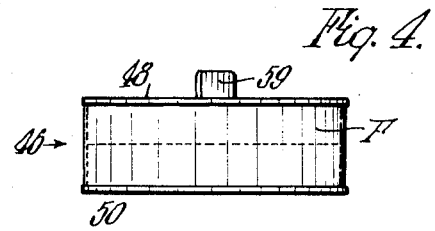
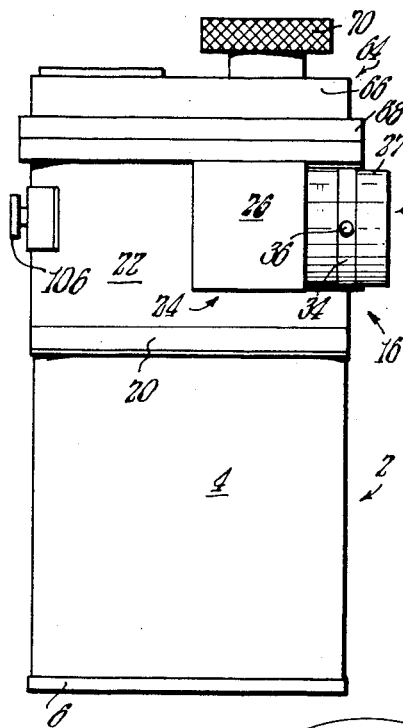
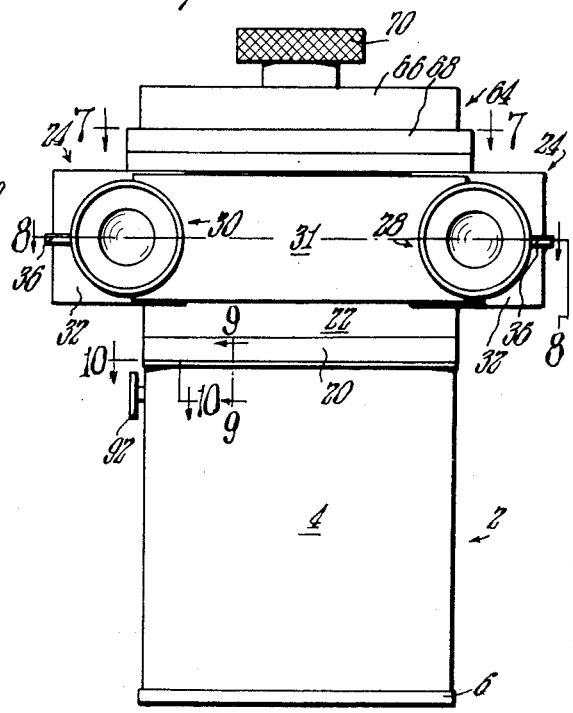
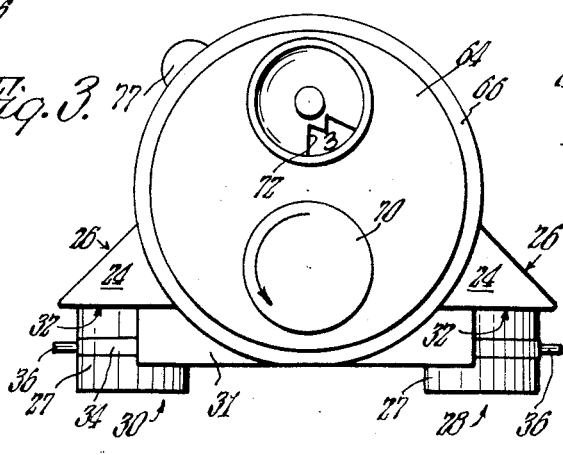
INVENTOR.
Douglass Crockwell.
BY June 21, 1960  D. CROCKWELL  2,941,458
CAMERA APPARATUS
Filed March 6, 1958  2 Sheets-Sheet 2
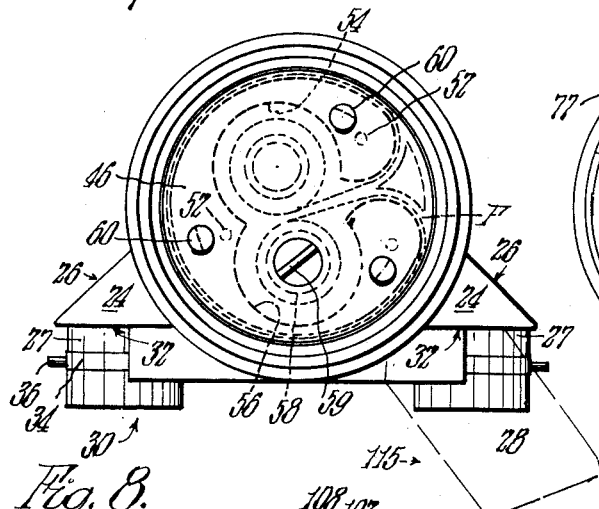
Fig. 6.
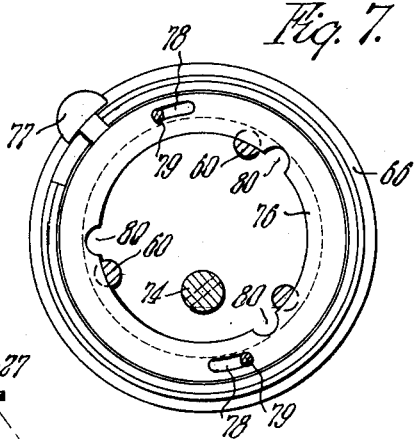
Fig. 7.
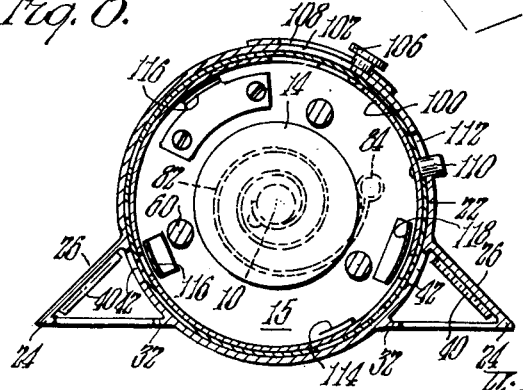
Fig. 8.
Fig. 10. Fig. 9.
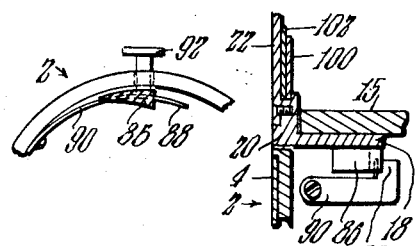
Fig. 12.
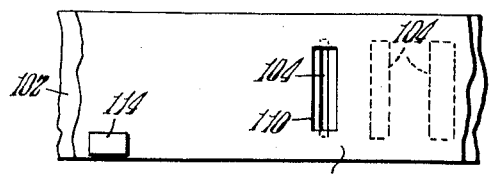
Fig. 13.
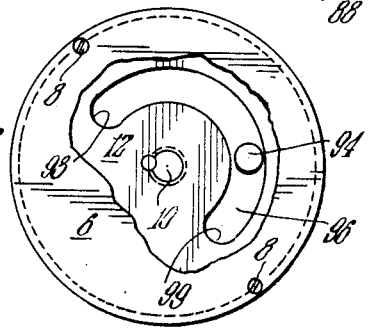
Fig. 11.
Fig. 15. Fig. 14.
INVENTOR.
Douglass Crockwell
BY Ross Ross Attys.

United States Patent Office

2,941,458
Patented June 21, 1960

2,941,458

CAMERA APPARATUS

Douglass Crockwell, 245 Sanford St., Glens Falls, N.Y.

Filed Mar. 6, 1958, Ser. No. 719,564

9 Claims. (Cl. 95—15)

This invention relates to new and useful improvements in camera apparatus for simultaneously taking combined stereoscopic and panoramic pictures, or for taking panoramic pictures.

The apparatus hereof is adapted for recording a pair of stereoscopic views embodying a pair of panoramic pictures to be viewed separately by the respective eyes of the viewer so as to be fused into a three dimensional image when so viewed, or if desired, a pair of longitudinally related panoramic views which are joined consecutively so that they may be sequentially viewed in seriatim.

The principal objects of the invention are directed to the provision of camera apparatus which is constructed and arranged for taking a pair of adjacent panoramic images on a film section, which images are steroscopically related, all within the control of the operator.

The camera apparatus of the invention is compact in form, is efficient in its operation so as not to require any special skill of the operator, and is easily and readily manipulated.

As one novel feature of the invention, the camera is easily and readily loaded with film material by means of a cassette carrying unexposed film. With a cassette in the camera, unexposed portions of the film are located in proper relation to the lens means by manually operable means.

As another novel feature of the invention, the lens carrying component is movable relative to the film to be exposed, which is held stationary, as by rotating same relative to the film at the desired speed. Objective lens systems are provided which reverse and rereverse the respective images of the subject being photographed as the rotor carrying the said lens systems rotates about the stationary film.

As a further novel feature of the invention, safety shutter means are provided which are manually operable so as to close the apertures from the lens means, when the lens supporting component is not rotating in its film exposing motion.

As a still further novel feature, manually adjustable means are provided for varying the areas or dimensions of the apertures for the lens means in order that light conditions, subject matter, and film characteristics may be taken advantage of and/or compensated for.

Various novel features and advantages of the invention will be observed from the following description of the camera apparatus in the form at present preferred, and it will be understood that various changes and modifications may be made in the form of the apparatus without departing from the spirit and scope of the invention.

In the drawings;

Fig. 1 is a front elevational view of camera apparatus embodying the novel features of the invention;

Fig. 2 is a side elevational view of the camera apparatus shown in Fig. 1;

Fig. 3 is a plan view of the camera apparatus shown in Figs. 1 and 2;

Fig. 4 is a front elevational view of the film cassette for the camera;

Fig. 5 is an isometric view of a reversing device for one of the lens mechanisms of the camera;

Fig. 6 is a plan view of the upper side of the camera with the cap member removed therefrom;

Fig. 7 is a sectional plan view on the line 7—7 of Fig. 1;

Fig. 8 is a sectional plan view on the line 8—8 of Fig. 1;

Fig. 9 is a sectional elevational view 9—9 of Fig. 1;

Fig. 10 is a partial section plan view on the line 10—10 of Fig. 1;

Fig. 11 is an elevational view of the shutter operating means of the camera;

Fig. 12 is an inverted plan view of the lower plate of the camera;

Fig. 13 is a fragmentary elevational view of the shutter and aperture means of the camera; and Figs. 14 and 15 are diagrammatic views explaining the operation of the camera.

Referring now to the drawings, the novel features of the invention will be more fully described.

The camera is provided with a lower support or hand grip portion, indicated generally by 2, which is preferably tubular in form, and has a covering sheath 4 therearound of suitable material, such as leather or the like. See Fig. 9. A lower cover plate 6 is secured to the lower end of the support 2 by screws 8 or the like. See Fig. 12.

An elongated staff 10 has its lower end secured in a wall 12 extending transversely of the support, as shown in Fig. 12.

A disc-like header 14 and a transverse wall 15 therebelow are secured to the upper end of the staff 10, and are shown in Figs. 8 and 9.

The parts just described form a stationary supporting structure of the camera. The lower support or hand grip portion 2 may be conveniently grasped in the hand for the operation of the camera.

A rotor indicated generally by 16 is provided above the lower support or hand grip portion 2, and has a lower disc or wall member 18 having a peripheral rim 20. See Fig. 9. The disc 18 is disposed between the upper end of the support 2 and the underside of the upper wall 15, and is freely rotatable in opposite directions relative to the staff 10 and the supporting structure.

An upper elongated tubular portion or cylinder 22 of the rotor 16 has its lower end secured to the rim 20 of the member 18, as in Fig. 9, so as to be rotatable therewith. The wall 18 and cylinder 22 form the rotor.

Hollow wings or lens supports 24 extend outwardly in opposite directions adjacent the upper end of the rotor cylinder 22, and have outer walls 26. The walls of the wings provide closed spaces for the inner ends of lenses and reversing mirrors, as will appear.

Lens barrels 27 of lenses 28 and 30 have inner ends secured in forward outer walls 32 of the wings 24. Said lens barrels are omitted in Fig. 8. A housing 31 is secured to the cylinder 22 and extends between the lens barrels with opposite ends thereof being fitted to the lens barrels.

The lenses 28 and 30 have the desired optical characteristics and are provided with iris devices of usual form. Said devices are simultaneously adjustable to obtain the openings desired, and same may be accomplished by means of an endless band 34, and projecting studs 36, as shown, in operative engagement with the iris adjusting devices of the lenses. The band 34 extends longitudinally of and within the housing 31. The lens mechanisms include the lenses 28 and 30, and mirrors 40 which are secured to the inner sides of the outer walls 26 of the wings 24, as shown in Fig. 8. The arrangement will be such that light through the lenses will be reflected through openings 42 provided through the cylinder 22 of the rotor into the interior thereof, and onto portions of a film strip. Said openings 42 may be of such dimensions and shapes as may be desired for the purpose intended. The lens mechanisms will embody lenses 28 and 30 having objectives of the well known type to reverse the subject matter, being photographed, from right to left horizontally, as well as vertically, while the mirrors 40 will correct the said horizontal reversal.

A cassette 46 is provided, an elevation of which is shown in Fig. 4. A plan view is shown in Fig. 6. For purposes of disclosure, the cassette will be formed by upper and lower parts 48 and 50 respectively, which parts are secured together by screws indicated by 52.

The cassette is provided interiorly with a cavity 54 for a roll or coil of unexposed film strip, and a cavity 56 for a roll or coil of wound up, exposed film. A winding arbor 58, rotatable in the cavity 56, is adapted for rotation in counterclockwise direction for winding up exposed film, and has an upwardly extending operating portion 59 for engagement by the winding mechanism.

The film, as it is wound up in the cavity 56, is drawn counterclockwise from the supply thereof in the cavity 54 and around the forward peripheral face of the cassette, as viewed in Fig. 6, and enters and passes from the cassette by means of slots, as shown.

The cassette 46 is positioned on elongated rods 60, which have lower ends secured to the wall 15 and which extend upwardly through said cassette.

A cap 64 is provided for releasably securing to the upper ends of the elongated rods 60, and includes upper and lower secured together parts, indicated as 66 and 68 respectively.

The said upper part 66 is provided with a manually rotatable film winding knob 70 which is operably connected by gearing to a dial having indicia thereon and being observable through a window 72, provided in the upper side of said upper part 66. This film winding and indicating mechanism is not shown in detail, and may include any well known mechanism for indicating sections or portions of a film strip. An operating member 74 extends downwardly from the upper knob 70 for engaging the portion 59 of the winding arbor of the cassette 46 when the cap is in place on the upper ends of the rods 60.

A lock ring, indicated generally by 76, is oscillatable in the portion 66 of the cap, as in Fig. 7. Said ring is provided with elongated slots 78 in which screws 79 are disposed, which screws secure the upper and lower parts of the cap together. The inner periphery of the ring 76, in the position shown in Fig. 7, is received in transverse cuts provided in the sides of and at the upper ends of the elongated rods 60. In this position, the cap is locked to the upper ends of the rods 60. As the ring is oscillated counterclockwise from the position shown, notches 80 provided in the ring register with the rods so that the ring is free of said rods and the cap may be removed upwardly from the rods to expose the cassette, as in Fig. 6. A manually engageable member 77 is provided to oscillate the ring 76 thereby to lock the cap to the rods or to release it therefrom.

The lower end of the cylinder 22 and rim 20 may be formed in various ways for interfitting snugly and securing together in rotor forming relation.

The cap, being secured to the rods 60, closes the upper side of the rotor cylinder 22, and is stationary with the support. The lower side of the cap and upper side of the cylinder 22 will have interlocking parts to provide a light tight connection, but will be such that the cylinder and rotor may rotate freely relative to the stationary cap. Said cap will be provided on the underside thereof with means to engage the upper side of the cassette and hold it against movement.

In the drawings, the rotor 16 is in what will be called the cocked position thereof, in readiness for rotation to expose the film. The rotor is releasably held or locked in said cocked position by means as will be later described.

Power means is provided for rotating the rotor clockwise when released, which, for purposes of disclosure, consists of a coil spring 82 within the support 2 and above wall 12 thereof. Said spring has an inner end secured in suitable manner to the staff 10 and an outer end secured to a stud 84 extending downwardly from the lower disc or wall 18 of the rotor 16.

Any desired form of spring motor may be employed, or, if desired, the rotor may be rotated by external means. It is desired that the rotor be rotated through its film exposing angle smoothly and at a desired speed.

The rotor 16 is releasably locked in its cocked position by such means as shown in Figs. 9 and 10. A lug 86 depends downwardly from the lower disc or wall 18 of the rotor cylinder and, as shown, is disposed behind an upstanding portion 88 at the outer free end of a spring 90, which is secured at its inner end to the inner side of the cylinder 22. The rotor cannot rotate clockwise by action of the spring motor when releasably locked, as shown.

A push button 92 is reciprocable in the wall of the lower support 2 and is connected operably to the free end of the spring 90. As the button is pressed inwardly, the holding portion 88 of the spring is deflected inwardly and removed away from the rear end of the lug 86, so that the spring motor rotates the rotor clockwise in its film exposing direction. A stop 94, associated with the disc 18 of the rotor, is disposed in an arcuate slot 96 of the wall 12, as in Fig. 12. By abutting the end 98 of the slot 96, the clockwise film exposing rotation of the rotor is arrested. Its angle of rotation is limited to some predetermined angle.

The rotor 16 is manually rotated counterclockwise to its cocked position. The lug 86, in such rotation, enters between the free end of the spring 90 and the wall of the support 2 to wedge the spring free end outwardly so that the wider end of the lug 86 may pass beyond the upstanding portion 88 of the spring. In cocked position, the spring 82 urges the rotor clockwise so that the lug is urged against the portion 88 of the spring 90.

The stop 94 is shown in Fig. 12 in the cocked position of the rotor. In cocking the rotor, allowance is made for the lug 86 to rotate beyond the locking spring. Abutment of the stop 94 with the opposite end 99 of the slot 96 limits the rotation of the rotor in the cocking direction.

Manually operable safety shutter means is provided and consists of an innermost relatively thin, somewhat flexible, circular band 100. A manually operable aperture means is provided and consists of an outer, relatively thin, and somewhat flexible circular band 102 outside of the band 100, and adjacent the inner side of the cylinder wall 22 of the rotor. Said bands are independently rotatable relative to one another and relative to the cylinder wall of the rotor.

The band 102 is provided with two groups of apertures in the form of slots 104, as in Fig. 15. Certain light conditions, subject matter to be photographed, and film characteristics may require a slot of a certain area. The selected apertures are positioned over the openings 42 into the lens wings by rotating the band. For this movement, a knob 106 affixed to the band 102 is movable along a slot 103 in the wall of the cylinder 22 of the rotor cylinder 22. See Fig. 11.

The band 100 is provided with apertures, such as 110, which, with the band related to band 102 as in Fig. 13, would allow light from the slot 104 of said band 102 to impinge the film. Except when the film is to be exposed, the band 100 may be rotated so that the apertures 104 of the band 102 are covered by the band 100. This is accomplished by rotating said band 100 by a knob 110 thereof which is movable in a slot 112 of the rotor wall 22. See Fig. 11. There will be corresponding apertures or slots in the bands for each of the lenses.

When the rotor is to be released for rotation clockwise to expose the film, the selected apertures 104 of the band 102 are uncovered by the band 100, so that the apertures of the two bands are in register.

At the end of the exposure rotation of the rotor, a projection 114 of the band 100 brings up against a stop 116 which is secured to the wall 15, see Fig. 8, so that the band 100 is moved counterclockwise sufficiently to bring the aperture 110 of band 100 out of register with the apertures 104 of the band 102 so that the apertures 104 are covered by the band 100. The rotor may then be rotated counterclockwise to its cocked position without danger of the film being light struck.

Baffles 116 and 118 are also provided and have lower ends secured to the wall 15 and extend upwardly adjacent the inner side of the inner band 100 to overlie the respective apertures of the bands and to shut off light from the lenses. Said baffles function to prevent light coming through apertures 104 from striking the film when the apertures of the band 100 are in register therewith, and when the rotor is in a cocked rest position in readiness for its film exposing rotation.

When the button 92 is pressed, the apertures 104, which are not covered by the band 100, are rotated past the baffles so that light impinges the film during the film exposing rotation of the rotor.

The film exposing rotation of the rotor may be of any angle up to 180 degrees. For purposes of disclosure, it may be considered as being an angle of 150 degrees.

In such rotation, with reference to Fig. 14, the lens 28 traverses the film strip through the path $a$ to $b$, and the lens 30 traverses the film strip through the path $c$ to $d$. This produces a pair of adjacent panoramic images on the film section, which images are stereoscopically related.

A reversing device is shown at 115, in Fig. 5, which has upper and lower walls 116' and 118' respectively connected by rear and end walls 120 and 122 respectively. Mirrors 124 and 126 are fixed to inner sides of the walls 120 and 122, as shown.

The walls 116' and 118' are arranged to embrace the upper walls of one of the wings 24 of the rotor, such as the wing for the lens 28, and are positioned on said wing, as in Fig. 6.

The device will be adjusted so that light from the rear will be reflected through the lens 28 as though the said lens were reversed 180 degrees.

In the film exposing rotation of the rotor in such a case, the lens mechanism 28 traverses the film, as shown in Fig. 15, from $a$ to $b$ and the lens 30 traverses the film from $c$ to $d$ so that there is produced a panoramic image having a total length equal to 300 degrees.

The device 115 which reflects the subject matter as though the lens mechanisms were reversed causes the lens mechanisms to see different portions of a scene which produce a pair of panoramic images having different subject matter, or two parts of a panoramic image.

It will be noted that the rotor, having the relatively spaced lens mechanisms, is mounted for rotation on a support so that said lens mechanisms traverse stationary film material for producing stereoscopically related panoramic images on a section of said film material.

As a special feature of the invention, mechanism is provided which is arranged to shut off light when the rotor is at rest and to automatically pass light during the film exposing rotation and to shut off light on completion of said rotation. The rotor is releasably locked in cocked position and, on release therefrom, it makes the film exposing rotation through a predetermined arc or angle, and may be readily returned to a cocked position where it is automatically releasably locked.

The film material may be negative, positive or of the color type, and it will be noted that the film strip, for exposure thereof, is held stationary while the rotor rotates concentrically therearound during its exposing rotation, facilitating the impingement thereon of a mirror-reversed image.

Various types of power means may be used to provide the desired smooth speed of rotation of the rotor, and, of course, the angle of film exposing may be as desired, within the limits of the apparatus.

The parts may be so arranged that the adjacent ends of the exposed portions of the exposed film may be contiguous or spaced, as may be desired. The exposed film may be viewed in a viewer, or by means of projection or otherwise, all as may be desired.

The section of the film strip having the dual exposures need not be separated, as the section may be viewed and treated as a unit.

In order that the images shall be stationary during the film exposing rotation of the rotor, the focal length of the lens mechanisms, including the objectives and the reversing mirrors, will closely approximate the radius or arc of that portion of the film strip to be exposed.

Various changes and modifications may be made to the form of the apparatus of the invention shown without departing from the spirit and scope thereof and therefore it is desired to be limited, if at all, by the appended claims rather than by the foregoing description.

I claim:

1. In a camera having a pair of separate exposure openings for simultaneously making separate exposures on a photosensitive medium, the combination of, a support, means carried by said support for holding the photosensitive medium to be exposed in fixed circular position relative thereto during exposures, a rotor rotatable on said support from a cocked position in a film-exposing motion and also rotatable through a non-film-exposing motion to the cocked position, a pair of concomitantly rotatable objective lens systems mounted on said rotor on spaced axes in planes transverse to the axis of rotation of said rotor for directing light for impingement on spaced areas on the photosensitive medium, a sleeve member having separate apertures permitting the passage of light from the objective lens systems of said pair thereof to the photosensitive medium, and closing means for closing the apertures of said sleeve member other than during the rotation of said rotor in the film-exposing motion.

2. In the camera as set forth in claim 1, the improvement including, unidirectional power means for rotating said rotor in the film-exposing motion.

3. In the camera as set forth in claim 1, the improvement including, stop means for arresting rotation of said rotor in the film-exposing motion beyond a pre-determined angle.

4. In the camera as set forth in claim 1, the improvement including, releasable lock means for locking said rotor in the cocked position.

5. In the camera as set forth in claim 1, the improvement including, means automatically operable on completion of the rotation of said rotor in film-exposing motion for closing the apertures of said sleeve member.

6. In the camera as set forth in claim 1, the improvement including, means for releasably holding said rotor in rest position and being manually operable to release said rotor for rotation in film-exposing motion.

7. In the camera as set forth in claim 1, the improvement including, means for changing the size of the apertures in said sleeve member for varying the amount of light admitted therethrough.

8. In the camera as set forth in claim 1, the improvement including, double panoramic reflective means for changing the objective axis of one of the lens systems of said pair thereof for the arrangement of a pair of longitudinally-related sequentially-arranged panoramic pictures.

9. In the camera as set forth in claim 1, the improvement including, said sleeve member and closing means being independently rotatable relative to each other and relative to said rotor, the apertures of said sleeve member and closing means being adjustably registrable with the lens systems of said pair thereof during rotation of said rotor in the film-exposing motion, and said closing means effecting non-registration of the apertures of said sleeve member with the lens systems of said pair thereof when said rotor is in other than its film-exposing motion.

References Cited in the file of this patent

UNITED STATES PATENTS

| | | |
|---|---|---|
| 586,097 | Jeffery | July 13, 1897 |
| 708,775 | Lumiere | Sept. 9, 1902 |
| 728,584 | Dickson | May 19, 1903 |
| 800,516 | Tournier | Sept. 26, 1905 |
| 1,957,043 | Harlow | May 1, 1934 |
| 2,319,530 | Bolsey | May 18, 1943 |
| 2,381,033 | Bolsey | Aug. 7, 1945 |
| 2,764,073 | Liu | Sept. 25, 1956 |